(12) United States Patent
Kauffman

(10) Patent No.: US 10,518,822 B2
(45) Date of Patent: *Dec. 31, 2019

(54) INNER WALL SYSTEM FOR CARGO CONTAINER

(71) Applicant: Ancra International LLC, Azusa, CA (US)

(72) Inventor: Gregory Alan Kauffman, Cincinnati, OH (US)

(73) Assignee: Ancra International LLC, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,864

(22) Filed: Mar. 13, 2018

(65) Prior Publication Data

US 2018/0201330 A1    Jul. 19, 2018

Related U.S. Application Data

(63) Continuation of application No. 15/591,417, filed on May 10, 2017, now Pat. No. 9,944,334.

(Continued)

(51) Int. Cl.
| | |
|---|---|
| *E04B 2/42* | (2006.01) |
| *B62D 25/00* | (2006.01) |
| *B62D 35/00* | (2006.01) |
| *B62D 33/04* | (2006.01) |
| *B62D 63/08* | (2006.01) |

(Continued)

(52) U.S. Cl.
CPC .......... *B62D 33/046* (2013.01); *B62D 63/08* (2013.01); *B62D 33/044* (2013.01); *B62D 35/00* (2013.01); *B65D 88/121* (2013.01); *B65D 90/08* (2013.01); *E04B 2/42* (2013.01); *E04B 2/58* (2013.01)

(58) Field of Classification Search
CPC ..... E04B 2/04; E04B 2/42; E04B 2/58; E04B 2001/747; E04B 1/7675; B65D 90/08; B65D 88/121; B65D 90/00; B65D 90/0026; B65D 90/02; B65D 88/12; B65D 90/023; B65D 53/06

See application file for complete search history.

(56) References Cited

U.S. PATENT DOCUMENTS 3,815,500 A * 6/1974 Glassmeyer ......... B61D 45/001
                                                    105/409
4,420,183 A * 12/1983 Sherman .............. B65D 90/043
                                                    296/39.1

(Continued)

*Primary Examiner* — Phi D A
(74) *Attorney, Agent, or Firm* — Brinks Gilson & Lione

(57) ABSTRACT

A wall system for a cargo container is provided. The wall system includes a plurality of panels that are configured to be fixed to logistics posts in a cargo compartment. Each panel includes a central portion and right and left end portions that are disposed on respective outboard sides of the central portion, the central portion includes a planar wall surface, the right and left end portions each include a planar wall surface. The central portion comprises two or more recessed portions that extend inwardly from the planar wall surface to define an elongate void that is configured to receive an elongate track therein, such that an outer surface of the elongate track, when disposed within the recessed portion, is co-planar with the planar wall surface of the central portion or disposed within the recessed portion and recessed behind the planar wall surface of the central portion.

15 Claims, 16 Drawing Sheets

Related U.S. Application Data

(60) Provisional application No. 62/425,806, filed on Nov. 23, 2016, provisional application No. 62/481,850, filed on Apr. 5, 2017.

(51) Int. Cl.
  *E04B 2/58* (2006.01)
  *B65D 88/12* (2006.01)
  *B65D 90/08* (2006.01)

(56) References Cited

U.S. PATENT DOCUMENTS

| | | | | |
|---|---|---|---|---|
| 5,934,849 | A * | 8/1999 | Haire | B60P 7/15 |
| | | | | 410/101 |
| 6,832,808 | B1 * | 12/2004 | Bennett | B62D 33/04 |
| | | | | 296/186.1 |
| 6,979,051 | B2 * | 12/2005 | Jones | B62D 33/04 |
| | | | | 296/182.1 |
| 7,100,971 | B2 * | 9/2006 | Pines | B62D 33/04 |
| | | | | 296/186.1 |
| 8,534,479 | B2 * | 9/2013 | Roush | B62D 33/046 |
| | | | | 220/1.5 |
| 9,944,334 | B1 * | 4/2018 | Kauffman | B62D 33/046 |
| 2003/0080586 | A1 * | 5/2003 | Ehrlich | B60P 7/15 |
| | | | | 296/191 |
| 2012/0234842 | A1 * | 9/2012 | Roush | B62D 33/046 |
| | | | | 220/660 |
| 2015/0353138 | A1 * | 12/2015 | Fenton | B62D 25/02 |
| | | | | 296/186.1 |

* cited by examiner

INNER WALL SYSTEM FOR CARGO CONTAINER

CROSS-REFERENCE TO RELATED APPLICATIONS

This application is a continuation of U.S. Nonprovisional application Ser. No. 15/591,417, filed May 10, 2017, which claims priority from U.S. Provisional Application No. 62/425,806, filed on Nov. 23, 2016, and from U.S. Provisional Application No. 62/481,850, filed on Apr. 5, 2017, the entirety of which are each hereby fully incorporated by reference herein.

BACKGROUND

This disclosure relates to cargo compartments for vehicles used in the transportation industry. Often captive beam systems are desired to be used in cargo compartments for transporting cargo, such as the long haul trucking industry. This disclosure relates to a system to allow for conveniently installing captive beam systems when the cargo compartment was constructed without captive beam systems in mind.

BRIEF SUMMARY

A first representative embodiment of the disclosure is provided. The embodiment includes a wall system for a cargo container. The wall system includes a wall portion comprising a central portion and right and left end portions that are disposed on respective outboard sides of the central portion, the central portion includes a planar wall surface, the right and left end portions each include a planar wall surface. The central portion comprises two or more recessed portions that extend inwardly from the planar wall surface to define an elongate void that is configured to receive an elongate track therein, such that an outer surface of the elongate track, when disposed within the recessed portion, is co-planar with the planar wall surface of the central portion or disposed within the recessed portion and recessed behind the planar wall surface of the central portion.

Other systems, methods, features and advantages of the invention will be, or will become, apparent to one with skill in the art upon examination of the following figures and detailed description. It is intended that all such additional systems, methods, features and advantages be within the scope of the disclosure, and be encompassed by the following claims.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

DETAILED DESCRIPTION OF THE DRAWINGS AND THE PRESENTLY PREFERRED EMBODIMENTS

Figure 1:
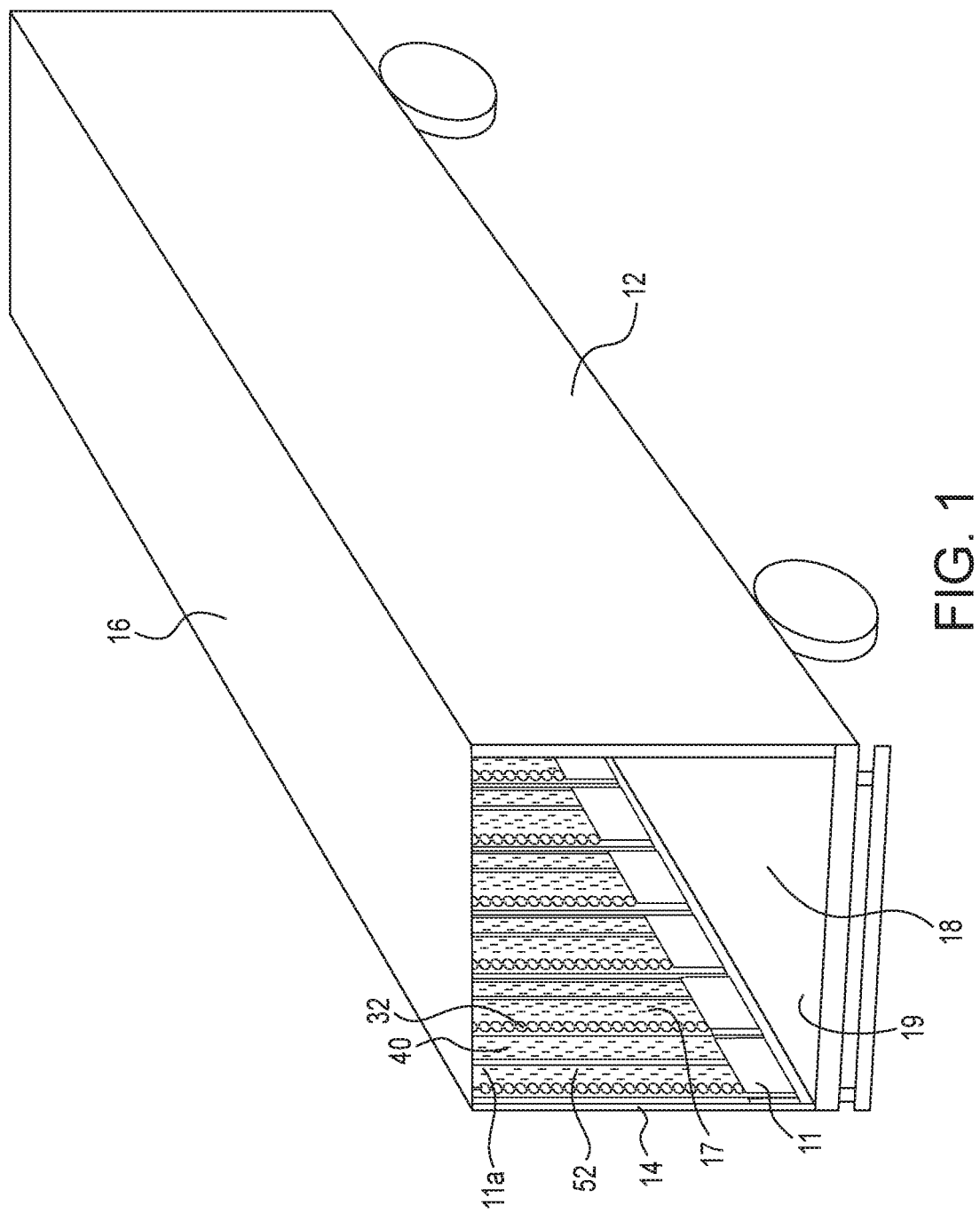
FIG. 1 is a perspective view of a cargo compartment that includes an inner wall formed from a plurality of panels that are each fixed to logistics posts within the cargo compartment.

Turning now to FIGS. 1-7, an inner wall system 10 for a cargo container is provided. The system 10 may be used for a mobile cargo container, such as a cargo compartment 18 of a truck (FIG. 1), a railroad car, a boat, an aircraft, or the like. While the system 10 is explained and depicted specifically with reference to a cargo compartment of a truck, one of ordinary skill in the art with reference to the subject specification and drawings will easily understand that the subject matter disclosed and claimed herein could be readily implemented for other movable objects that carry cargo in a secured manner, and can also be readily implemented for a stationary cargo compartment or structure, such as a storage unit. Any differences in the design of the disclosed subject matter that is relevant to a specific mode of transportation (or stationary) will be discussed herein in detail.

The system 10 is configured to define the inner walls 17 of a cargo compartment, and is configured to be fixedly assembled to the support structure of the cargo compartment 18 to be fixed with respect to the outer walls 12, 14 of the cargo compartment. The system 10 when installed provides a smooth inner wall 17 within a cargo compartment and provides a plurality of apertures 90 at various different positions to install decking beams (such as conventional A or E decking beams) or logistics straps within the cargo compartment for supporting cargo on multiple levels as well as for appropriately shoring cargo during transport. The system 10 is configured to support vertical tracks 80 for captive beam systems. Captive beam systems are known in the art and include a track 80 that receives a shoe that supports one end of a decking beam, with the opposite end of the decking beam being supported by a second shoe that is received within a second track 80 that is positioned on the opposite side wall of the cargo compartment 18. The shoes are configured to be slidable within the tracks, to allow the decking beam to be positioned at a desired height within the cargo compartment, with the shoe including a plurality of lugs or other type of fitting that is selectively received within one of a plurality of corresponding apertures or lugs/nodes within the track to fix the shoe (and therefore the decking beam) in the desired position. When the decking beams are not desired (such as during loading and unloading), the decking beams can be slid along both opposite tracks toward the ceiling. In some embodiments the shoes are connected to the decking beam with an adaptor that allows the decking beam to telescope with respect to the shoe, which allows the decking beam to be moved upward and downward along the opposed tracks 80 one side at a time.

Figure 5:
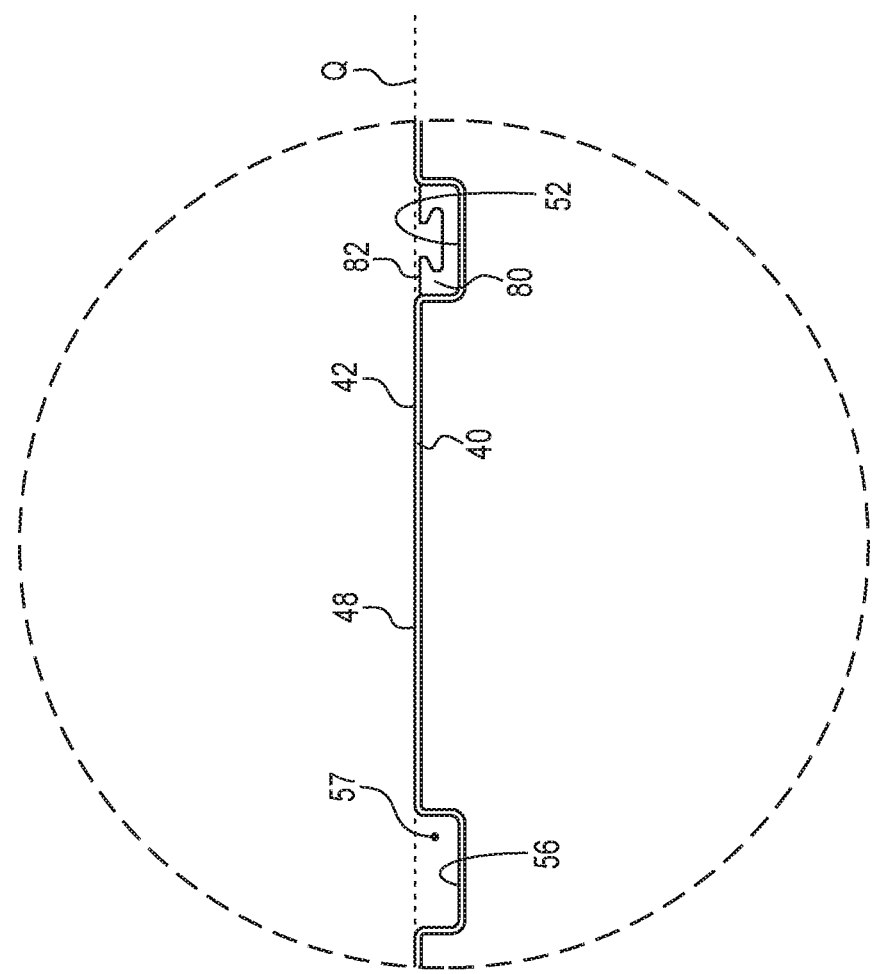
FIG. 5 is a view of detail A of FIG. 4.

The system 10 is provided to receive tracks 80 for a captive beam system, with the front surface 82 of the vertical track 80 either disposed along the same plane as the inner facing surface 48 of the inner panels 40, or in other embodiments (as shown in FIG. 5) the front surface 82 of the vertical track 80 is slightly recessed inwardly from a plane Q through the inner facing surface 48 of the inner panel 40, and specifically the inner facing surface 48 of the central portion 42 of the inner panels 40.

Figure 2:
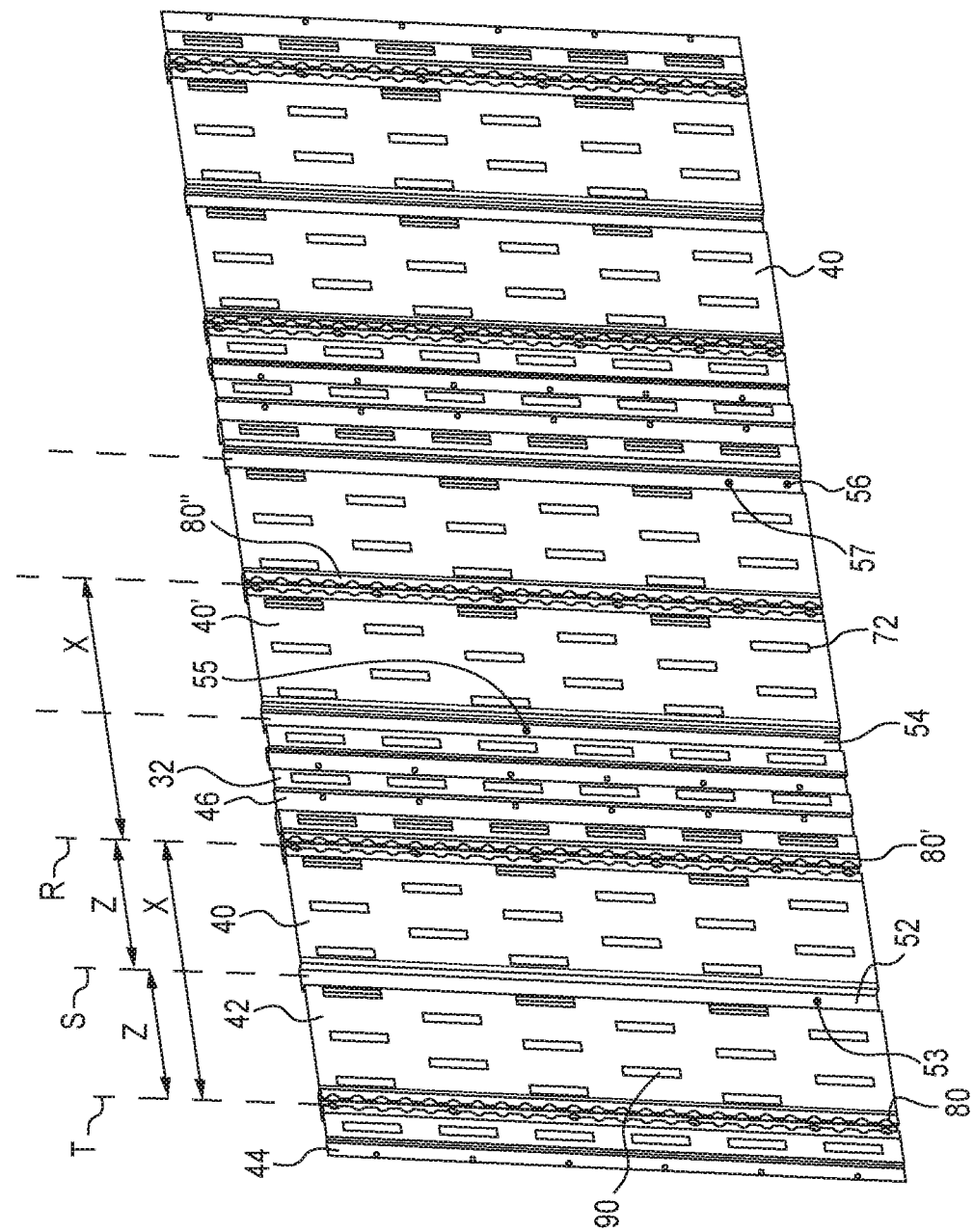
FIG. 2 is a perspective view of the inner wall of FIG. 1.

The system 10 is best shown in FIG. 2. The system includes a plurality of inner panels 40, which each span between two neighboring vertical logistics posts 32 that are attached to the outer walls 12, 14 of the cargo compartment (or in some embodiments provide the structural support for the outer walls 12, 14 of the cargo compartment and/or the roof of the cargo compartment). Many conventional cargo compartments include inner volumes that are formed with outer walls and exposed logistics posts 32 that provide structure for connection of cargo control equipment as well as other components.

The inner surface of the cargo compartment 18, when the system 10 is installed, includes a plurality of panels 40 that are disposed along the entire length, or a portion of the entire length, of the cargo compartment 18 to form the inner walls 17 of the cargo compartment. In some embodiments and as discussed in detail below, the panels 40 include one or more recessed portions 52, 54, 56 vertically disposed along all or a portion of the height of the panels, which are configured to receive vertical tracks 80 for a captive beam system. As discussed below, the recessed portions define voids that are spaced to allow for the elongate tracks 80 to be positioned at consistent spacings (such as on 16 inch centers) when the panels 40 are installed, such that a plurality of captive beams can be provided within the cargo compartment 18 at consistent spacings for use.

Figure 4:
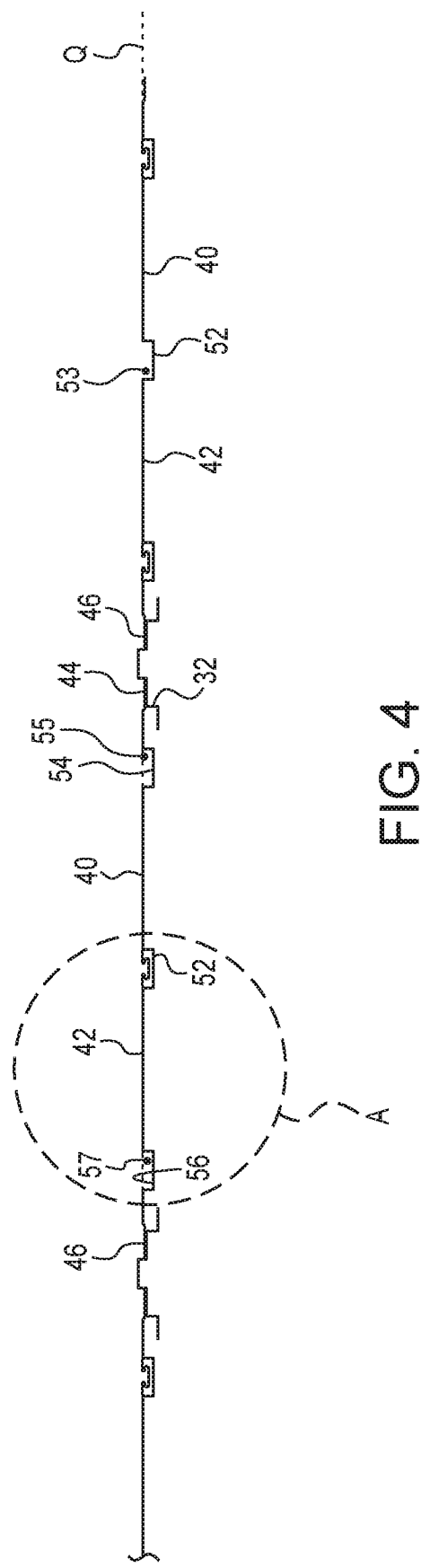
FIG. 4 is a top view of a portion of the inner wall of FIG. 1 depicting vertical tracks disposed in some of the recessed portions of the panels forming the inner wall.
Figure 6:
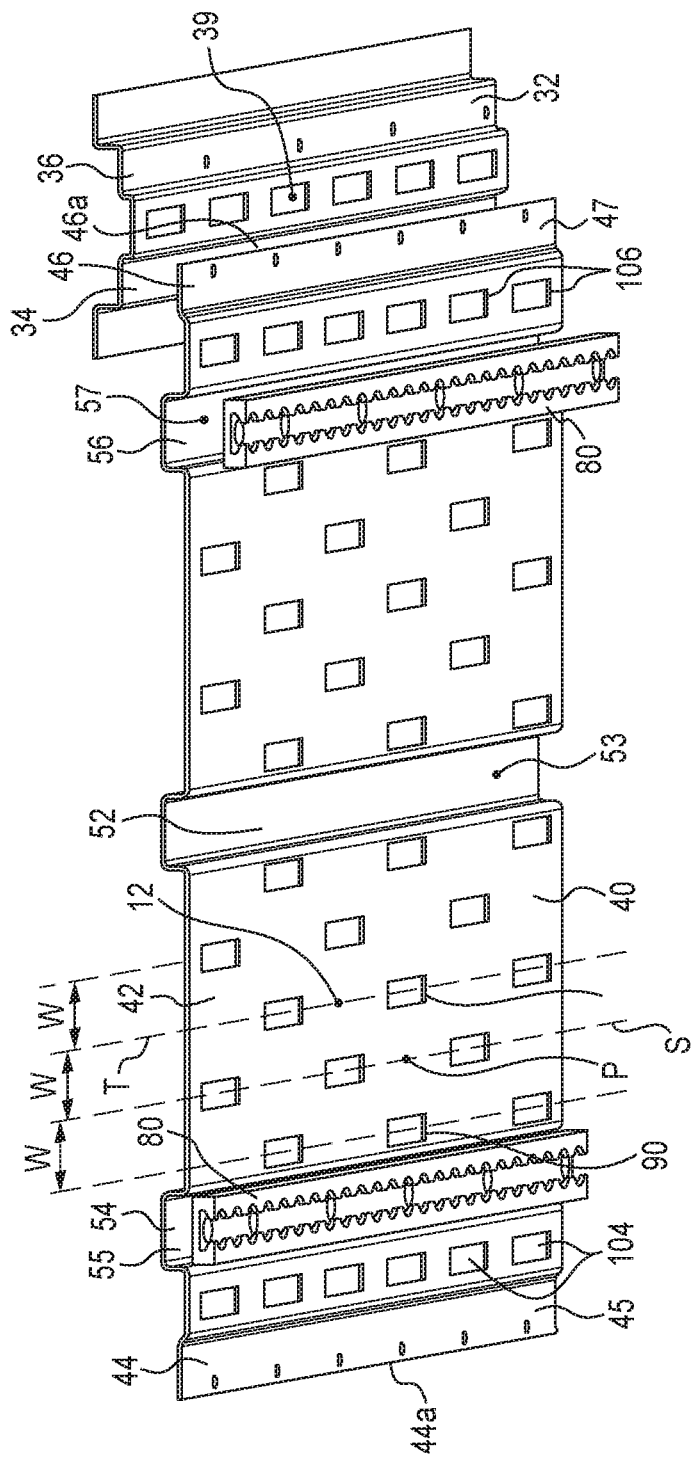
FIG. 6 is an exploded perspective view of a logistics post of the cargo compartment, a panel, and vertical tracks that collectively form the inner wall of FIG. 1.
Figure 7:
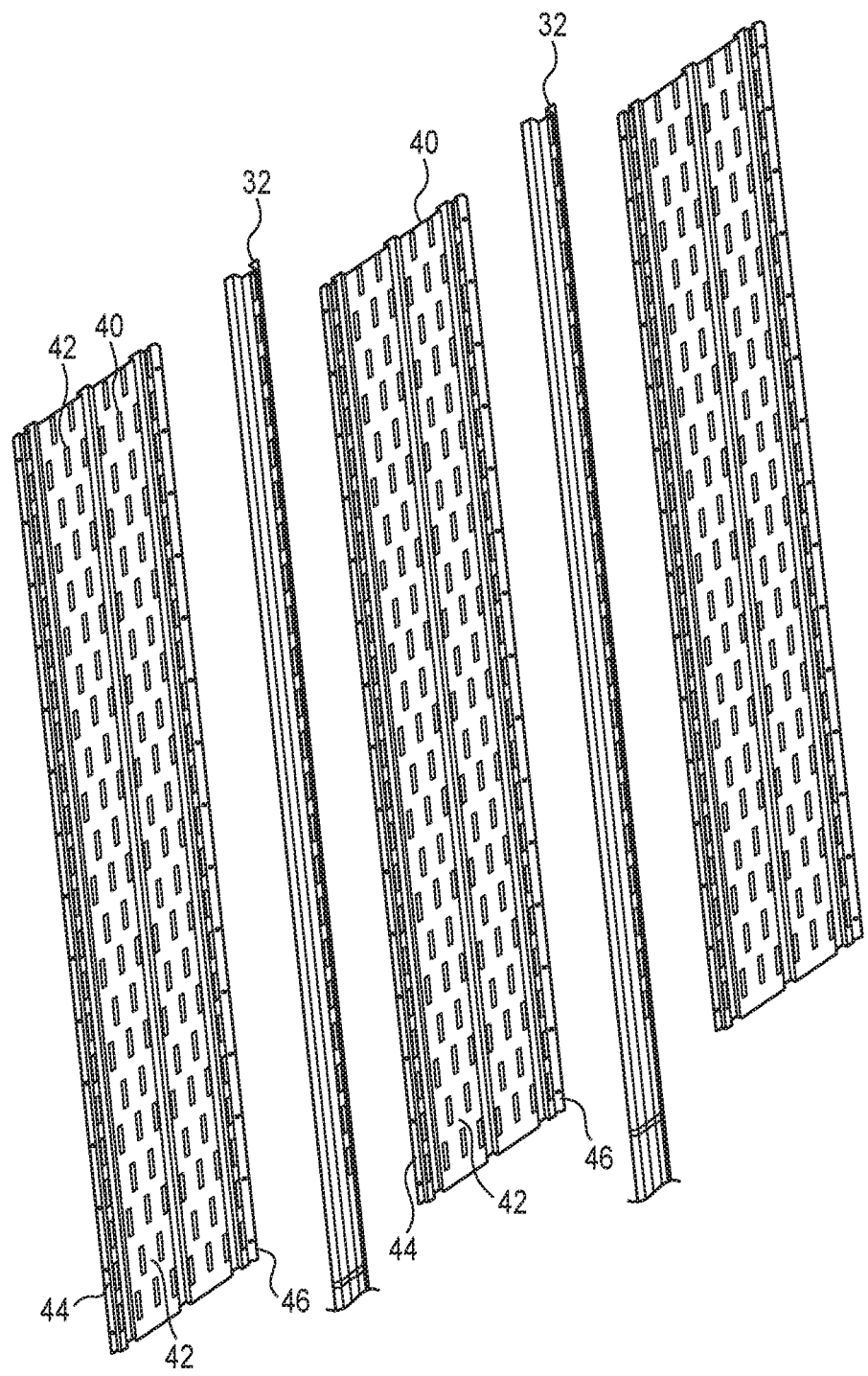
FIG. 7 is an exploded view of panels and logistics tracks to form the inner wall of FIG. 1.

The inner wall portion, or panel 40 is best shown in FIGS. 2, 4, and 6. The panel 40 includes a central portion 42 and right and left end portions 44, 46 that are each disposed outboard of the central portion 42 and on respective opposite right and left sides of the central portion 42. The central portion 42 includes a planar front face 48 through which a plane Q extends (FIGS. 4, 5). When a plurality of wall panels 40 are installed within the cargo compartment to collectively define an inner wall 17 of the cargo compartment (FIG. 1), each of the front faces 48 of the neighboring panels 40 may extend along the same plane Q.

The panels 40 may be sized to extend from the floor 19 of the cargo compartment to the roof 16 of the cargo compartment, or specifically the inner surface of the roof. In some embodiments, the cargo compartment may include structural bottom rails 11 and or top rails 11a. In these embodiments, the panels 40 may be sized to abut against the bottom and top rails 11, 11a when provided. The vertical tracks 80 provided upon the panels 40, discussed herein, may be the same length as the height of the panels 40, or may be longer or shorter than the panels 40, dependent upon the desired length of travel of the captive beam (discussed above) that slides within the vertical track 80 and the desired stowed height of the captive beam when not in use.

The central portion 42 of the panel 40 may include one, two, three, or a different plurality of parallel recessed portions (first, second, and third 52, 54, 56 depicted in the figures, one of ordinary skill in the art would easily comprehend with a thorough review of the subject specification how to construct the central portion 42 of similar panels 40 with a differing number of recessed portions) that in some embodiments extend vertically along the entire height of the panel 40 or in other embodiments, extend only partially along the height of the panel 40. The recessed portions 52, 54, 56 each establish a void 53, 55, 57, respectively, that provides room for a vertical track 80, which is configured to slidingly and lockable receive a shoe on an end of a captive beam to allow the captive beam to be retained at a desired position along the length of the track 80 (and the panel 40). The recessed portions may each extend in parallel to each other (and to the right and left side edges 44a, 46a of the panel 40, such that when the panel 40 is fixed to the logistics posts 32 within the cargo compartment, the panels are disposed vertically 40 and the recessed portions 52, 54, 56 are disposed vertically to receive the tracks 80 vertically.

In some embodiments, the recessed portions 52, 54, 56 are disposed at a consistent spacing from each other, such that vertical tracks 80, when selectively positioned with some or all of the recessed portions will be disposed at consistent centerline spacing.

In one preferred example, the central portion 42 of the panel 40 includes three recessed portions, a center recessed portion 52, and outboard right and left recessed portions 54, 56. As shown in FIG. 2, the recessed portions 52, 54, 56 are aligned so that their respective centerlines S, T, R are also aligned in the same spacing relationship and in parallel to each other. In some embodiments, the recessed portions 52, 54, 56 may be aligned such that neighboring recessed portions (e.g. S and T, and S and R) are each aligned at 8 inch spacing from each other (distance Z), such that the distance between center lines T and R is 16 inches from each other (distance X, which is twice distance Z). While this preferred embodiment is described with 16 inch centers, which is standard and normally used in the United States, other spacings, such as typical similar spacings for nations or regions that use the metric system can easily be employed instead of the dimensions presented here.

The overall width of the panel 40 may be about 24 inches, and specifically equal to 24 inches minus the thickness of the exposed front surface of the vertical logistics post 32 of the cargo compartment 18 (for embodiments where logistics posts are placed at 24 inch centers along the wall), for embodiments where the logistics posts are at different spacing, the width (and number and spacing of the recesses) would similarly be modified consistent with this disclosure. As shown in FIG. 2 with this arrangement, a consistent 16 inch spacing (across two neighboring panels 40, 40' and the logistics post 32) can also be 16 inches (distance X) when the track 80 is disposed within the center recess 52 of the second panel 40' and the post is within the left recess 56 of the first panel 40. Accordingly, in this arrangement, neighboring panels 40 support vertical tracks 80 within differing recessed portions 52, 54, 56 to maintain the consistent spacing the vertical tracks 80 (one panel 40 has tracks 80 at the right and left recesses 54, 56, while the neighboring panel 40' has a track 80 at the center recess 52' and so on). This arrangement allows for the multiple of the same panel 40 panel design to be used to form the entire desired inner wall 17 of the cargo compartment, with the tracks 80 selectively positioned within some (but often not all) of the recesses to achieve the desired centerline position of the tracks 80.

The panel 40 includes right and left end portions 44, 46 that are disposed, respectively outboard of and connected to the central portion 42. The right and left end portions 44, 46 each include a flat portion 45, 47 that are configured to rest upon a logistics post 32 and specifically a flat portion of the logistics post 32 that is outboard of a central portion of a logistics post (which normally includes a plurality of apertures disposed therealong (which can receive ends of conventional beams, such as A or E beams). The left and right end portions 44, 46, and in some embodiments the respective flat portions 45, 47 are fixed to the logistics post 32 with a plurality of fasteners, such as screws, rivets, adhesive or the like.

In some embodiments, the central portion 42 of the panel 40 may include a plurality of apertures 90 spacing disposed therein. The apertures 90 are provided to receive an end of a decking beam (such as a conventional A or E beam), or other cargo control structure. In some embodiments, the apertures 90 may be disposed in a plurality of horizontal rows with consistent spacing between neighboring apertures 90 in each row. In some embodiments, vertically neighboring rows may be provided such that apertures 90 are aligned vertically along the same line, while in other embodiments, as shown in FIGS. 2 and 6, the apertures 90 may be disposed in a staggered orientation. For example, vertical rows may be positioned, such that a horizontal centerline S of one, some, or all of the apertures 90 within a row are vertically aligned with a center point P along the wall of the central portion 42 that is midway between the horizontal centerlines of two adjacent apertures 90 in the row below. Other patterns of apertures 90 may be provided.

In some embodiments, the panel 40 may be constructed from a single sheet of material that is formed into the desired orientation by bending, with the bending process forming the plurality of recesses 52, 54, 56, and the right and left end portions 44, 46. The apertures 90 in the central portion 42 (when provided) and a plurality of apertures 104, 106 in the respective right and left end portions 44, 46 may be established by stamping or machining. In some embodiments, the panel 40 is formed by steel, while in other embodiments, the panel 40 may be formed by other metals, and in other embodiments, the panel 40 may be formed by a composite or plastic, or multiple layers of materials. One of ordinary skill in the art with a thorough review and understanding of this disclosure, as well as an understanding of the rated loads to be supported by the panels (though direct connection with the apertures 90, when provided), as well as the load carried by the vertical tracks, via the captive beam system, will be able to determine the type of material that is best used for the panels based upon cost, availability, and weight considerations.

Figure 3:
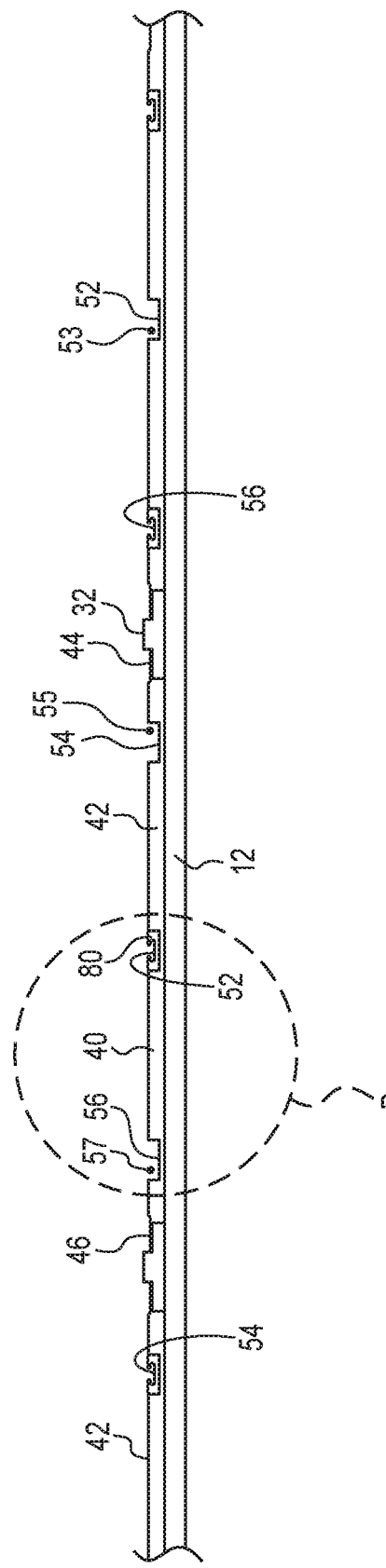
FIG. 3 is a top view of the inner wall of FIG. 1 and the outer wall of the cargo compartment.
Figure 3A:
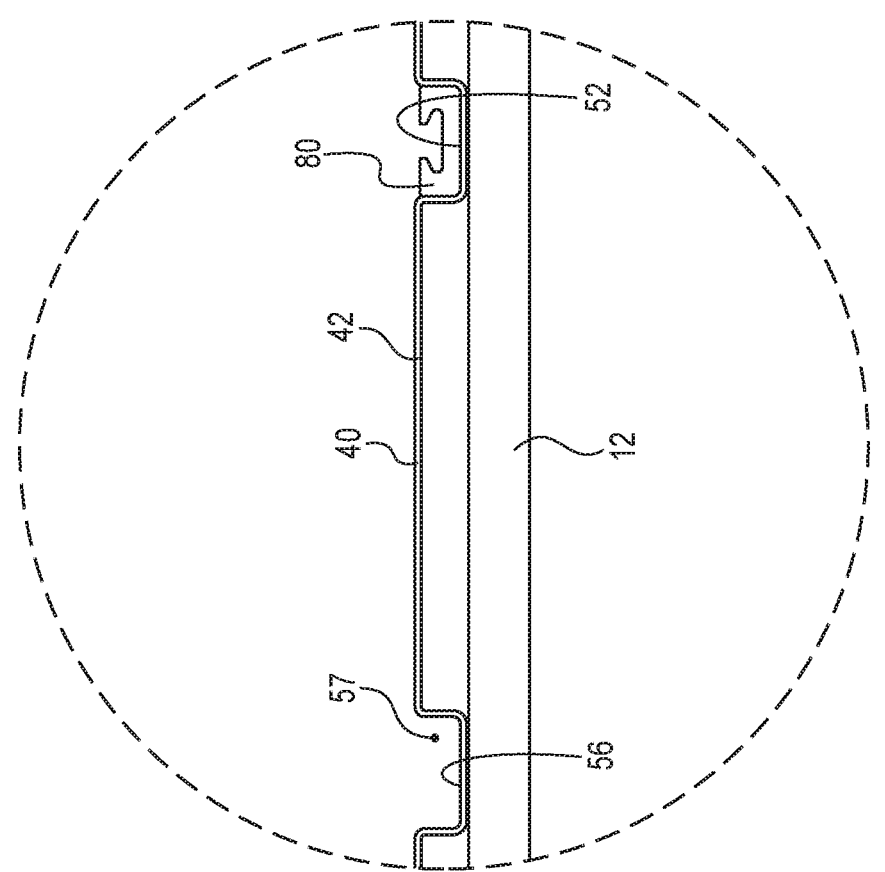
FIG. 3a is a view of detail B of FIG. 3.

As best shown in FIG. 3, the panel 40, and specifically the plurality of panels 40 that are aligned with a plurality of logistics posts 32 to form an elongate inner wall 17, may be disposed in parallel with and closely mounted to the respective outer wall 12, 14 of the cargo compartment 18. In some embodiments, the outer wall 12, 14 may support the logistics posts 32, while in other embodiments, the outer wall 12, 14 may be supported by the logistics post 32. In some embodiments, the panels 40, when positioned with respect to and fixed to the logistics posts 32 may be disposed such that the central portion 42 of the panel 40 is aligned in parallel with the outer wall 12, 14. In embodiments depicted in FIG. 3, the panel 40 is constructed such that the back wall of each recessed portion 52, 54, 56 is proximate to but not nominally in contact with the outer wall 12, 14. In other embodiments, as shown in the modified detail view of FIG. 3*a*, the recessed portions 52, 54, 56 may be constructed such that they are in contact with the outer wall 12, 14.

Figure 8:
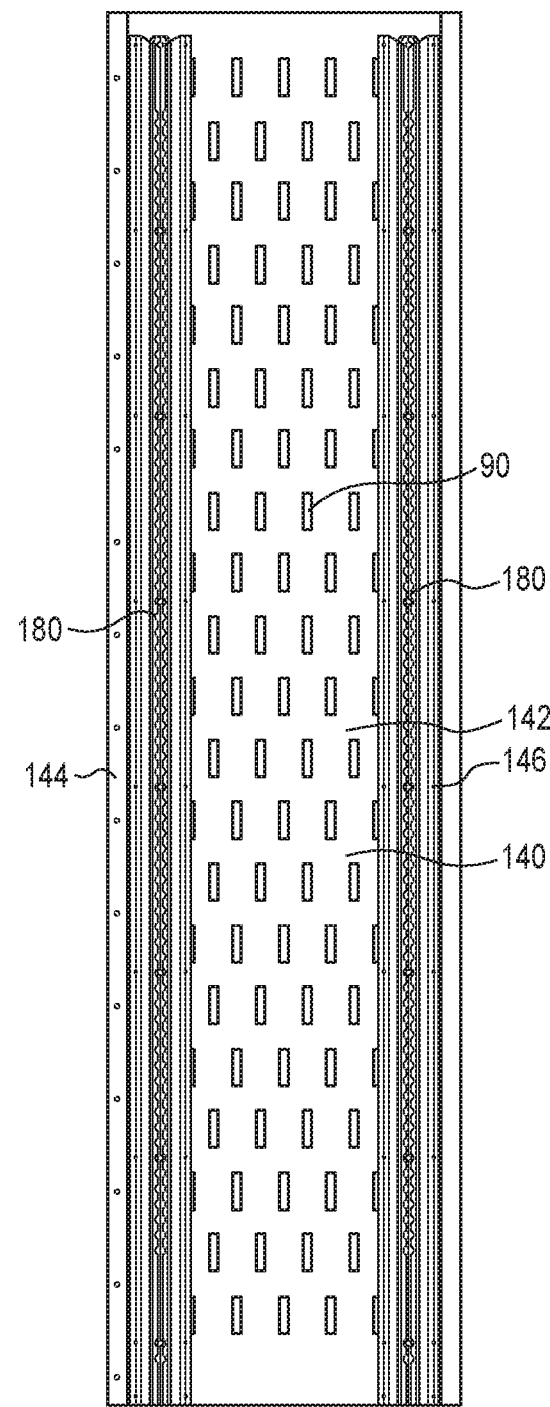
FIG. 8 is a front view of an alternate panel that could be used to form the inner wall of FIG. 1.
Figure 9:
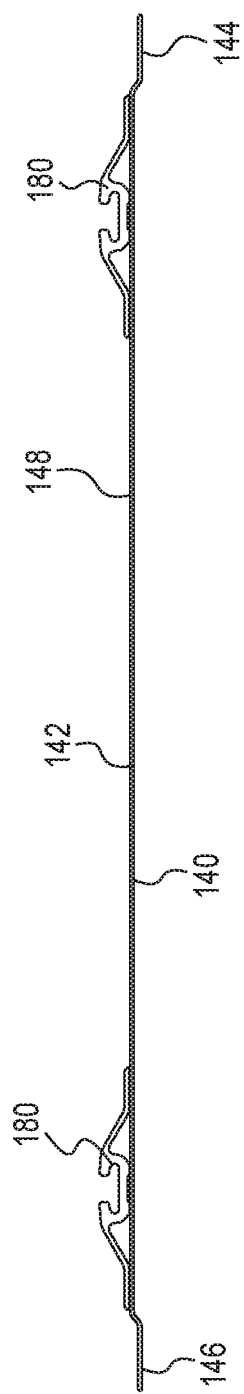
FIG. 9 is a top view of the panel of FIG. 8.

In other embodiments depicted in FIGS. 8-9, the system 10 may be modified to include a plurality of panels 140 that are attached to spaced logistics posts 32 within a cargo compartment 18, where the panels 140 include a central portion 142 and right and left end portions 144, 146, which contact and are fixed to neighboring logistics posts 32, such as in the manner that the end portions 44, 46 connect to logistics posts 32 as discussed above. In these embodiments, the central portion 142 is formed without elongate recesses, such that elongate tracks 180 (or potentially elongate track 80 as depicted in FIGS. 1-7) can be fixed to the central portion 142 at desired spacings to establish consistent vertical centerline spacing between the elongate tracks 80. In these embodiments, the front face 182 of the elongate track extends proud of the planar front face of the central portion 142 of the panel.

In some embodiments depicted in FIGS. 10-15, a modified system 1000 is provided. The system 1000 includes a plurality of panels 1040 are provided along the inner surface of the inner walls 17 of a cargo compartment in much the same manner as the system 10 described above. The panels 1040 used with the system 1000 are the same as the panels 40 used with the system 10 with the specific differences mentioned herein.

Panels 1040, as in the panels 40, each may span between two vertical neighboring logistics posts 32 that are attached to the outer walls 12, 14 of the cargo compartment (or in some embodiments provide the structural support for the outer walls 12, 14 of the cargo compartment and/or the roof of the cargo compartment), with the panels being fixes to the logistics posts. In other embodiments, the panels may be fixed directly to the trailer walls or to other structural components of the cargo compartment.

The inner surface of the cargo compartment 18, when the system 10 is installed, includes a plurality of panels 1040 that are disposed along the entire length, or a portion of the entire length, of the cargo compartment 18 to form one or both of the inner side walls 17 of the cargo compartment. In some embodiments and as discussed in detail below, the panels 1040 include one or more recessed portions 1052, 1054, 1056 vertically disposed along all or a portion of the height of the panels, which are configured to receive vertical tracks 80 for a captive beam system, such as the panel 1040*a* (FIGS. 11-12) that includes one recessed portion 1052 and a panel 1040*b* (FIGS. 13-15) that includes two recessed portions 1054, 1056. In some embodiments, the panels 1040 may be installed in a repeating pattern between panel pattern as in: 1040*a*, 1040*b*, 1040*a*, 1040*b* etc., while in other embodiments only the panel 1040*a* (or 1040*b*) may be used or the panels 1040 may be installed in other patterns as would be appreciated by one of ordinary skill in the art after a thorough review of this specification.

As discussed below and similar to the panels 40, the recessed portions 1052, 1054, 1056 define voids that are spaced to allow for the elongate tracks 80 to be positioned at consistent spacings (such as on 16 inch centers) when the panels 1040 are installed, such that a plurality of captive beams can be provided within the cargo compartment 18 at consistent spacings for use. As with the panel 40, the recesses in the panels 1040 are disposed such that the front surface of the elongate track 80 is flush with or slightly recessed below the front surface of the panel 1040.

The panels 1040 (including panels 1040a, 1040b) include central portions 1042 (similar to 42 as discussed above) and right and left end portions 1044, 1046 (similar to 44, 46) that are each disposed outboard of the central portion 1042 on respective opposite sides of the central portion 1042. As with portions 44, 46 discussed above, the right and left end portions 1044, 1046 each include a flat portion that are configured to rest upon a logistics post of the trailer and specifically a flat portion of the logistics post that is outboard of the logistics post that normally includes apertures for receiving decking beams or the like. The portions 1044, 1046 each may be made with a plurality of predrilled holes 1090 that are provided to allow for fasteners to connect the panels to the logistics posts of the trailer. The predrilled holes 1090 may be provided at consistent spacings, such as 1 inch between centers of neighboring holes 1090.

Figure 10:
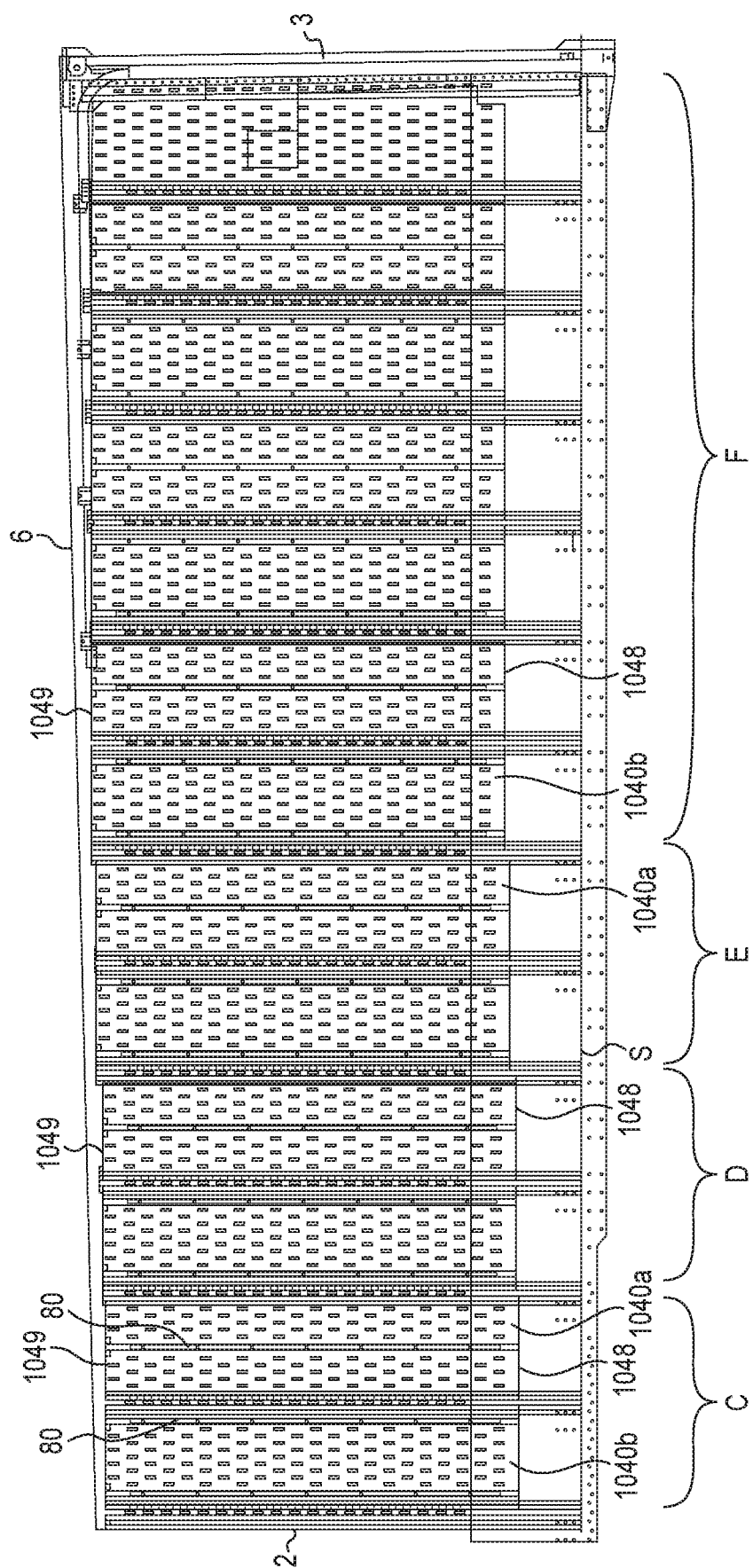
FIG. 10 is a side view of an inner wall of a cargo compartment with a plurality of panels that are each fixed to the side wall of the cargo compartment with the panels disposed upon the side wall in a vertically staggered fashion.
Figure 11:
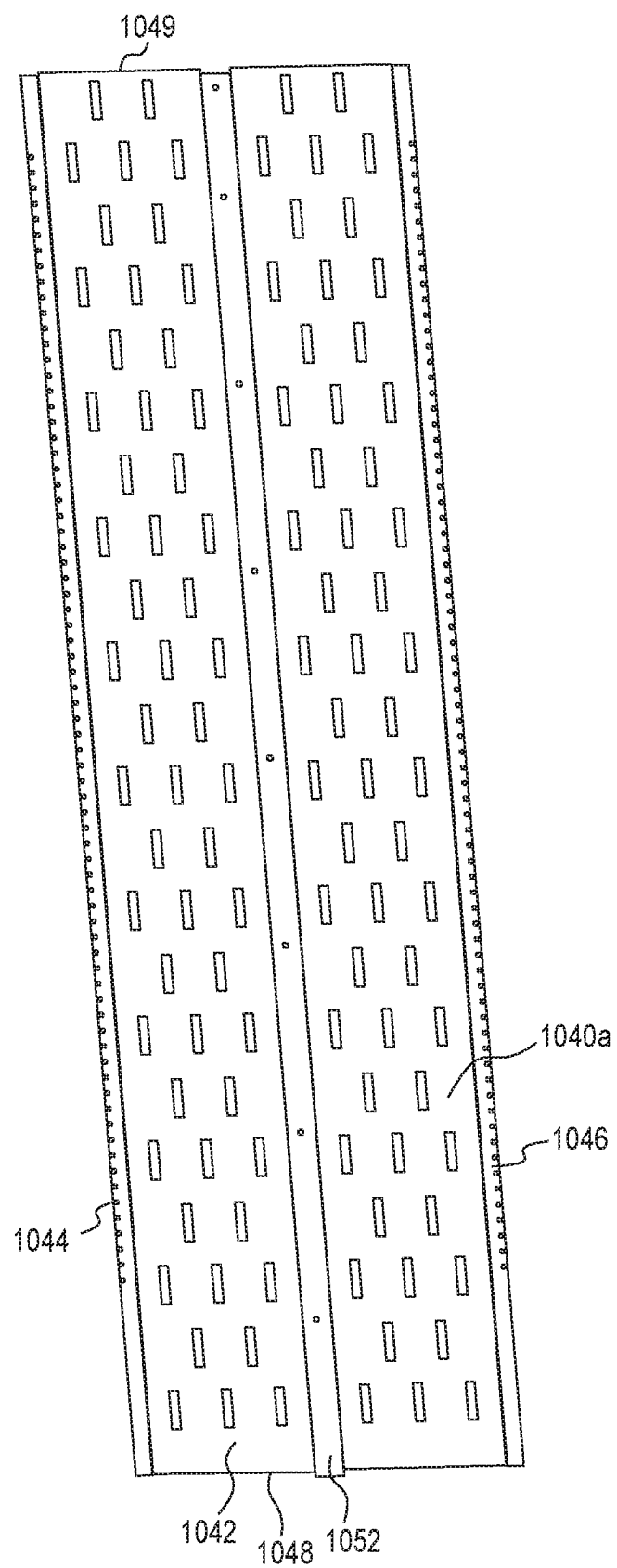
FIG. 11 is a perspective view of a first panel usable as some of the plurality of panels of FIG. 10.
Figure 12:
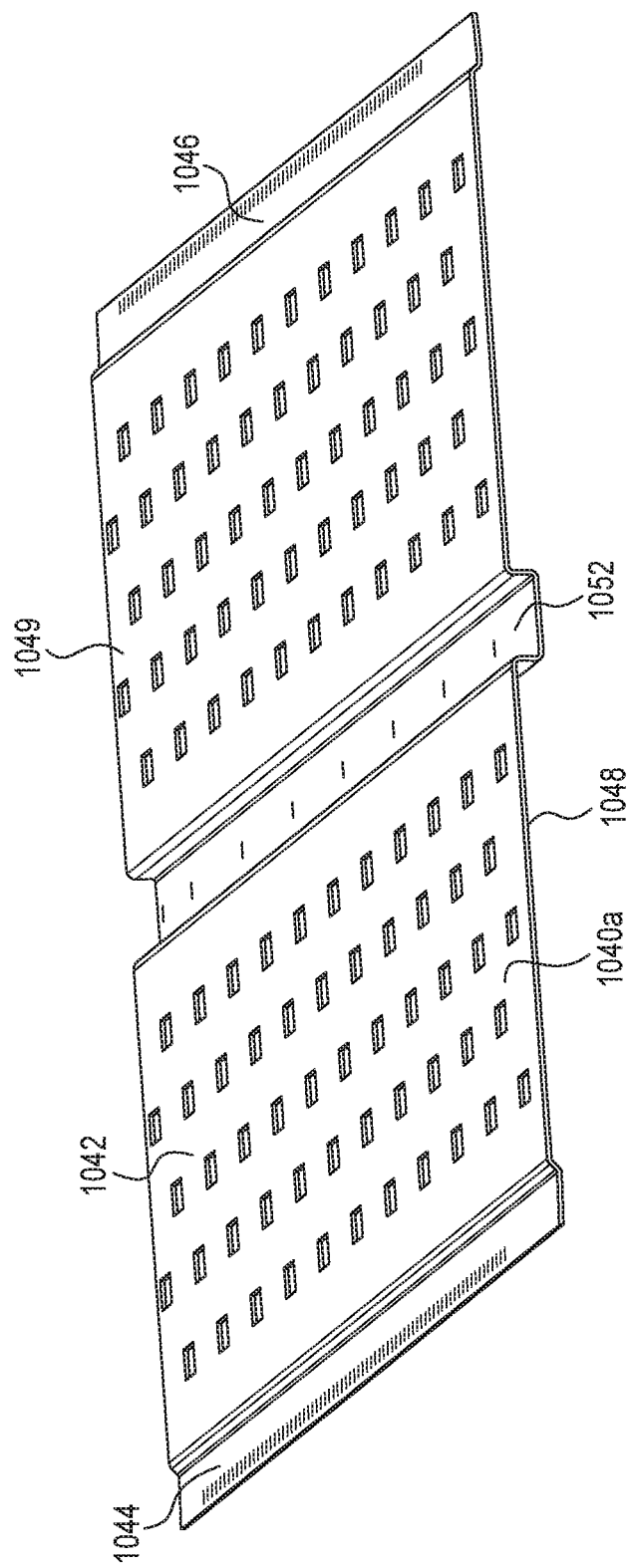
FIG. 12 is another perspective view of the panel of FIG. 11.
Figure 13:
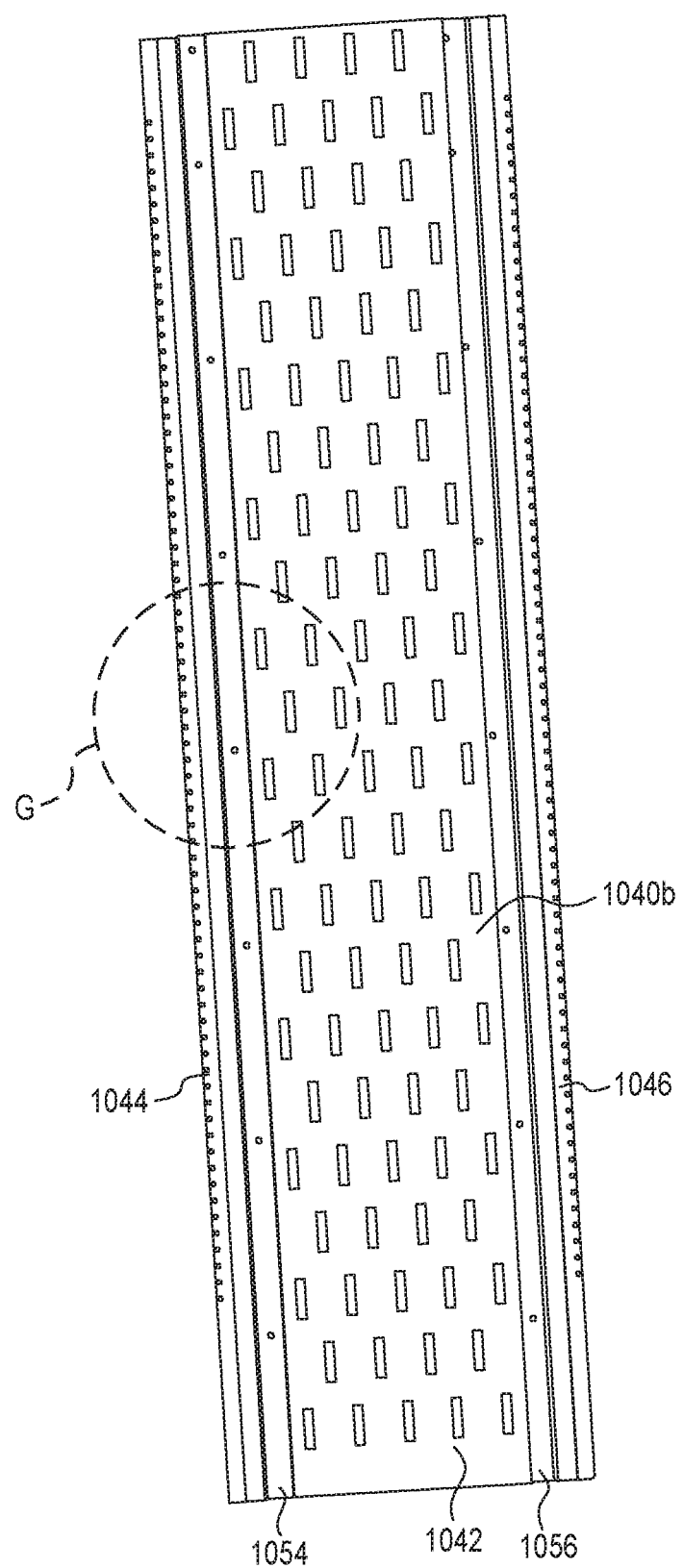
FIG. 13 is a perspective view of a second panel usable as some of the plurality of panels of FIG. 10.
Figure 14:
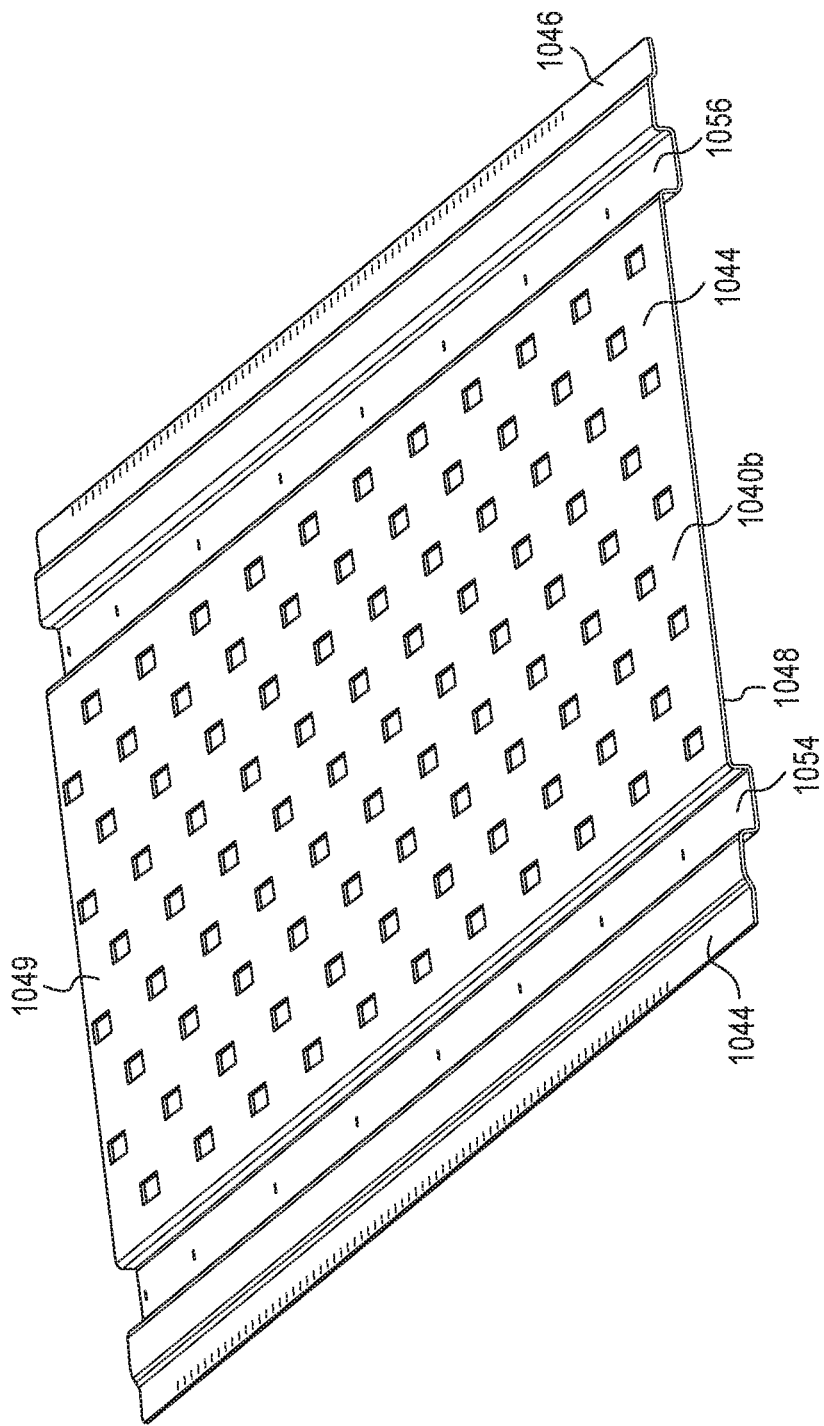
FIG. 14 is another perspective view of the panel of FIG. 13.
Figure 15:
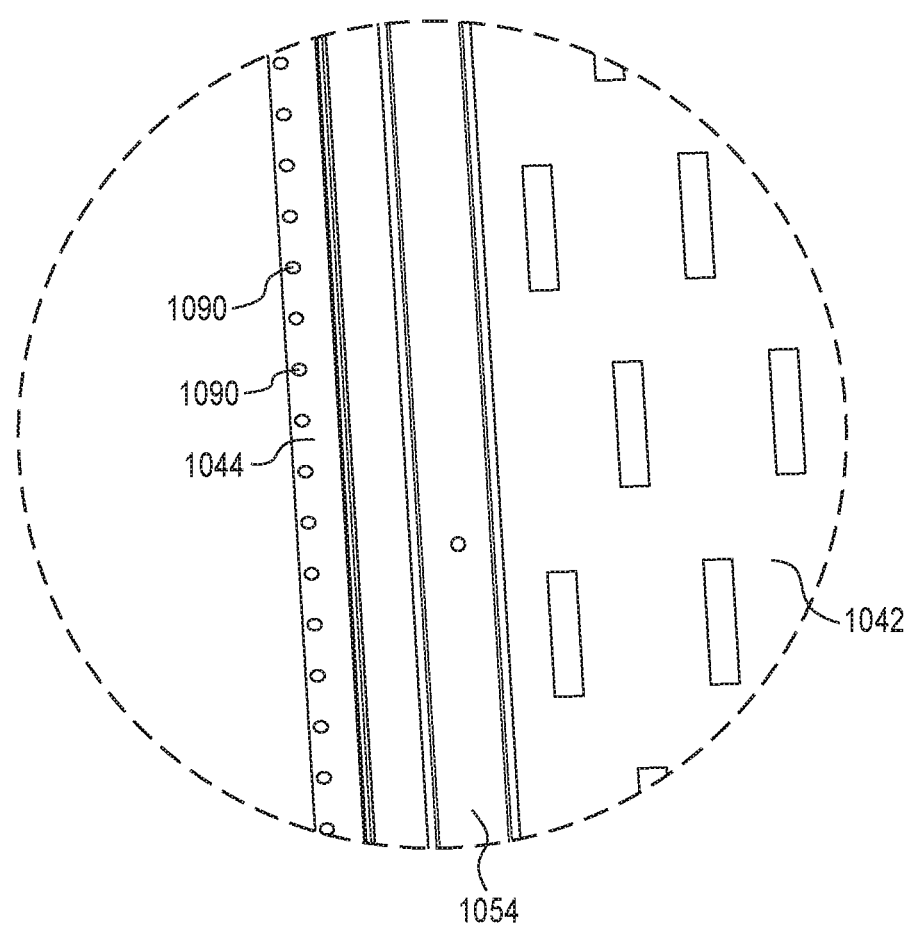
FIG. 15 is a view of detail G of FIG. 13.

As shown in FIG. 10, a plurality of panels 1040 (either uniform panels, or alternating panels 1040a, 1040b) may be disposed upon the side wall of a trailer (and fixed to the logistics posts of a trailer, or to other structure of the trailer) to define an inner surface of the trailer and to allow for attachment for elongate tracks 80 thereto to receive captive beams along the elongate tracks (as in the system 10 discussed above). In system 1000, the panels 1040 may be arranged in a vertically staggered manner along the length of the side wall. In one embodiment, the bottom edge 1048 of the panels 1040 neighboring the front (enclosed) end 2 of the cargo compartment (panels C of FIG. 10) may be closest to the floor 19 of the trailer, and after a certain number of panels (such as 1, 2, 3 or the like) that are disposed along the length of the side wall at that height, the next certain number of panels 1040 (panels D) may be disposed vertically higher, such as 1 inch higher than the panels 1040 closest to the front end of the trailer, such that the bottom edge 1048 of those panels is one inch higher. Further panels 1040 may be again vertically higher (see panels identified as E and F in FIG. 10) such as two inches higher than the panels C along the length of the side wall of the trailer. While FIG. 10 depicts four staggered vertical heights of the panels, one of ordinary skill after a thorough review of this specification will easily comprehend that more or less vertical staggers can be used during installation. This system 1000 may be used for trailers where the roof 6 of the trailer is not parallel with the floor 19 of the trailer (as depicted in FIG. 10), as is sometimes used in industry, such as to allow for a slightly bigger rear door for ease of loading and unloading cargo from the trailer. The system 1000 allows for the top edge 1049 of the panels 1040 to be close to the roof 6 of the trailer along the length of the trailer as possible, such that the captive beams (that travel along the elongate tracks 80) can be as close to the roof 6 as possible when vertically stowed to allow the maximum room within the trailer for unloading and loading.

The inclusion of holes 1090 upon the right and left portions 1044, 1046 of the panels 1040 at close consistent spacings allows for the panels 1040 to readily be installed upon the side wall of the trailer at the staggered vertical heights without requiring detailed measurements by the installed, rather the eyeball can install the panels at a desired vertical staggering (such as with 1 inch staggering between panels C and D, and between panels D and E and so forth) by simply fastening the panels at the same level above the floor with staggered holes upon the panels 1040.

While particular elements, embodiments, and applications of the present invention have been shown and described, it is understood that the disclosure is not limited thereto because modifications may be made by those skilled in the art, particularly in light of the foregoing teaching. It is therefore contemplated by the appended claims to cover such modifications and incorporate those features which come within the spirit and scope of the disclosure.

The invention claimed is:

1. A wall system for a cargo container, comprising:
a wall panel comprising a central portion and right and left end portions that are disposed on respective outboard sides of the central portion, the central portion includes a planar wall surface, the right and left end portions each include a planar wall surface that is parallel to the planar wall surface of the central portion, wherein the right and left end portions are configured to be fixed to separate adjacent vertical logistics posts of a cargo compartment, and the right and left end portions define respective right and left outer vertical edges of the wall panel,
the central portion comprises a recessed portion that extends inwardly from the planar wall surface to define an elongate void with a rectangular cross-section that is configured to receive an elongate track therein, wherein the recessed portion has a vertical longitudinal axis that extends through a center of the recessed portion,
further comprising an elongate track, that when assembled, the elongate track is disposed within the void of the recessed portion and in contact with one or more surfaces of the panel defining the central portion, such that an outer surface of the elongate track, when disposed within the recessed portion, is co-planar with the planar wall surface of the central portion or disposed within the recessed portion and recessed behind the planar wall surface of the central portion,
wherein the central portion further comprises a plurality of apertures disposed therethrough that are each configured to receive and support an end of a decking beam.

2. The wall system for a cargo container of claim 1, further comprising second wall portion identical to the wall portion, wherein the wall portion and the second wall portion are configured to be fixed to a vertical logistics post of a cargo compartment, with the left end portion of the wall portion fixed to a right side of the vertical logistics post and the right end portion of the second wall portion fixed to a left side of the vertical logistics post.

3. The wall system of claim 1, wherein the elongate track configured to be received within the void is a track with a plurality of apertures to receive either A or E type decking beams.

4. The wall system of claim 1, wherein the elongate track configured to be received within the recessed portion includes a plurality of lugs and nodes of an aircraft seat track.

5. The wall system of claim 1, wherein the elongate track configured to be received within the void is a track configured to receive an end of a captive beam that is free to slide along the elongate track and to be fixed in one of a plurality of positions along the elongate track.

6. The wall system of claim 1, wherein the right and left end portions of the wall portion are each configured to be fixed to a vertical logistics post of a cargo compartment that is supported by a side wall of the cargo compartment, wherein, when the wall portion is fixed to the vertical logistics post, a rear surface of each of the two or more recessed portions contacts the side wall of the cargo compartment.

7. The wall system of claim 1, wherein when the elongate track is disposed within the elongate recessed portion of the central portion, the outer surface of the elongate track is co-planar with the planar wall surface of the central portion.

8. The wall system of claim 1, wherein the wall portion is fixed to a vertical logistics post of a side wall of a cargo compartment with a plurality of fasteners that extend through a respective left or right end portion that contacts the vertical logistics post and the logistics post, with the other of the respective left or right end portions of the wall portion contacting a neighboring second vertical logistics post upon the side wall of the cargo compartment with the respective end portion fixed to the second vertical logistics post with a plurality of fasteners.

9. The wall system of claim 8, wherein the elongate track is fixed to the recessed portion within the central portion with a plurality of fasteners.

10. The wall system of claim 1, wherein the plurality of apertures is arranged in a plurality of rows of apertures that each extend in a spacing relationship from a top to a bottom of the central portion.

11. The wall system of claim 10, wherein the plurality of rows of apertures each include a plurality of apertures, wherein the plurality of apertures within each of the plurality of rows of apertures are disposed at in a spacing relationship with an equal distance between horizontal centerlines of neighboring apertures.

12. The wall system of claim 11, wherein neighboring vertical rows of the plurality of rows of apertures are disposed such that a vertical centerline through one or more apertures in a first row is vertically aligned with a point midway between adjacent apertures in a second row below the first row.

13. The wall system of claim 1, wherein portions of the central portion proximate to each of the right and left end portions comprise a plurality of vertically aligned apertures, which are each configured to support an end of a decking beam.

14. The wall system of claim 1, comprising the wall portion installed upon a wall of a cargo compartment at a first vertical distance from a floor that supports the side wall, and a second wall portion like the wall portion installed upon the wall at a second vertical distance from the floor that is larger than the first vertical distance.

15. The wall system of claim 14, comprising a third wall portion like the wall portion, installed upon the wall proximate to the second wall portion and further from the wall portion at a third vertical distance from the floor that is larger than the second distance from the floor, where a difference between the third distance and the distance is twice a difference between the second distance and the distance.

* * * * *